Patented Oct. 31, 1939

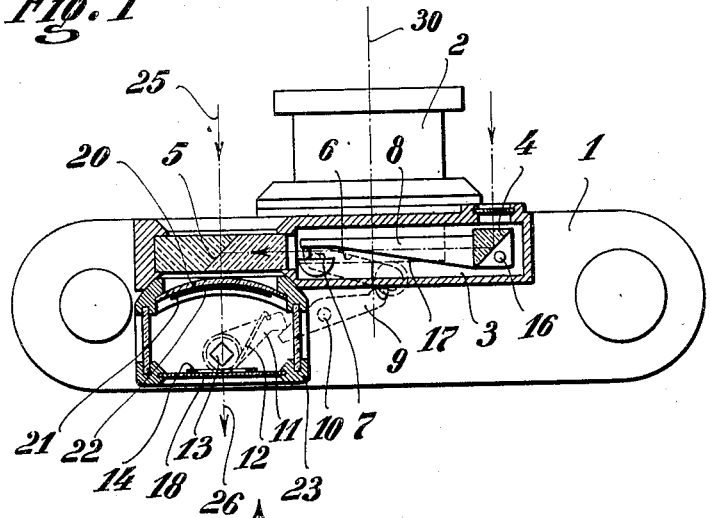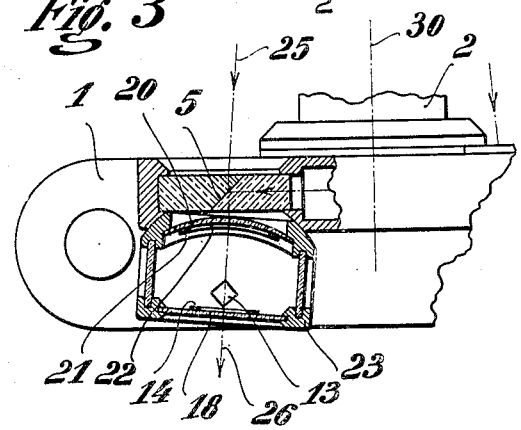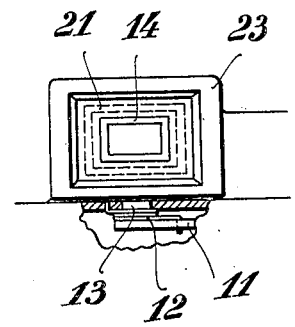

2,178,344

UNITED STATES PATENT OFFICE 2,178,344

PHOTOGRAPHIC CAMERA

Ludwig Leitz and Wilhelm Albert, Wetzlar, Germany, assignors to Ernst Leitz, G. m. b. H., Wetzlar, Germany Application January 22, 1938, Serial No. 186,312
In Germany February 6, 1937

2 Claims. (Cl. 95—44)

This invention relates to improvements in photographic cameras which include a built in basis distance meter and a built in view finder, the basis distance meter being coupled to the objective for direct operation when the objective is being focused. The view finder is of the direct view type the optical axis of which coincides with the optical axis of the ocular of the basis distance meter. More particularly the view finder is of the type which includes a partly silvered hollow or concave mirror which reflects a view framing mask in infinity. A view finder of this type is disclosed for instance in the U. S. Patent No. 2,093,299 dated September 14, 1937.

Photographic cameras including a basis distance meter and a view finder of the general type referred to suffer from the disadvantage that when the basis distance meter is operated the optical axis of the view finder is not adjusted to compensate for parallax. In other types of cameras the arrangement is such that the basis distance meter in order to compensate for parallax is displaced in its relation to other parts or the optical elements of the basis distance meter are displaced.

The object of this invention is to provide a combined basis distance meter and view finder system embodying novel features whereby the disadvantages referred to are eliminated. This may be done by a construction in which the view finder is swingably mounted with relation to the basis distance meter and directly operated by the latter to compensate for parallax. In the accompanying drawing illustrating the invention Fig. 1 is a top plan view of a camera embodying the invention with parts broken away to show the basis distance meter and the view finder in section.

Fig. 2 is a view of a front portion of the camera looking in the direction of arrow 2 in Fig. 1.

Fig. 3 is a view similar to Fig. 1 with parts removed and omitted and showing the view finder operated to compensate for parallax. Referring to the drawing the camera 1 is provided with an objective 2. The basis distance meter 3 includes the movable prism 4 which together with the fixed prism mirror which is provided with a semi-transparent reflecting surface 5 constitutes the basis of the basis distance meter. The prism 4 is carried by the lever 8 which is pivoted at 16. The lever 8 is oscillated in a known manner upon its pivot 16 by another lever 6 which is pivoted at 7. The lever 6 in turn is actuated by contact with the inner end 17 of the objective mount.

The view finder includes a rear transparent glass member 18 provided with a rectangular non-transparent frame 14, and a front transparent glass body 20 provided with a concave mirrored rectangular frame 21 which surrounds and frames the field of view opening 22. The view finder is mounted in a suitable housing 23 which is pivoted on a fixed axis at 13 to a finder arm 11 which engages one end of a two armed lever 9 pivoted at 10. The other end of the lever 9 engages the aforesaid lever 6. A spring 12 keeps the two levers 11 and 9 in constant engagement and likewise keeps the lever 9 in engagement with the lever 6 as will be understood. As is clear from the drawing, the optical axis of the view finder indicated by the line 25 is coincidental with the direct view line 26 of the basis distance meter.

When the objective is focused, the movable prism 4 is operated by the range finder levers 6 and 8 to project the incoming image into coincidence with the image which is seen through the prism mirror 5. Simultaneously therewith the view finder is oscillated on the axis 13 by means of the levers 9 and 11 into the position shown in Fig. 3 in which the optical axis 26 of the view finder is inclined towards the optical axis 30 of the objective whereby to compensate for parallax between view finder and objective. The levers are not shown in Fig. 3.

We claim:

1. In a photographic camera having an objective, a combined basis distance meter and a pivotally supported photographic view finder of the direct-view type, a wholly transparent glass body in front of said view finder provided with a centrally disposed semi-transparent surface for reflecting the image of the basis distance meter into the optical axis of the view finder in coincidence with the field of view of the latter, means interposed between the said pivotally mounted view finder and the said basis distance meter and actuated by the latter when the objective is focused for moving the view finder on its pivoted support to incline its optical axis towards the objective to compensate for parallax, said camera having separate light admitting openings for the said view finder and the said basis distance meter and an eye opening common to said finder and distance meter.

2. In a photographic camera having an objective, a combined basis distance meter and a pivotally supported photographic view finder, of the direct-view type, a wholly transparent glass body in front of said view finder provided with a centrally disposed semi-transparent surface for reflecting the image of the basis distance meter into the optical axis of the view finder in coincidence with the field of view of the latter, an operating arm secured to the basis distance meter, a second operating arm secured to the pivotal support of the view finder, a lever interposed between said arms and contacting the same to move the view finder on its pivotal support to incline the optical axis of the view finder towards the objective when the latter is focused whereby to compensate for parallax, said camera having separate light admitting openings for the said view finder and the said basis distance meter and an eye opening common to said finder and distance meter.

LUDWIG LEITZ.
WILHELM ALBERT.